United States Patent
Murawa et al.

(10) Patent No.: US 7,735,888 B2
(45) Date of Patent: Jun. 15, 2010

(54) RAILWAY VEHICLE WHEEL WITH ELASTIC RUBBER SUSPENSION

(75) Inventors: Franz Murawa, Bochum (DE); Björn Schumacher, Wuppertal (DE)

(73) Assignee: Bochumer Verein Verkehrstechnik GmbH, Bochum (DE)

( * ) Notice: Subject to any disclaimer, the term of this patent is extended or adjusted under 35 U.S.C. 154(b) by 0 days.

(21) Appl. No.: 11/993,189

(22) PCT Filed: Jun. 30, 2006

(86) PCT No.: PCT/EP2006/063731
§ 371 (c)(1), (2), (4) Date: Apr. 17, 2008

(87) PCT Pub. No.: WO2007/003591
PCT Pub. Date: Jan. 11, 2007

(65) Prior Publication Data
US 2008/0217940 A1     Sep. 11, 2008

(30) Foreign Application Priority Data
Jun. 30, 2005   (DE) ................ 10 2005 030 966

(51) Int. Cl.
*B60B 17/00* (2006.01)
*B60B 9/10* (2006.01)
(52) U.S. Cl. .............. 295/11; 152/41; 152/246
(58) Field of Classification Search .......... 295/7, 295/11; 152/17–18, 21, 40–44, 47–49, 246
See application file for complete search history.

(56) References Cited

U.S. PATENT DOCUMENTS

| | | | | |
|---|---|---|---|---|
| 1,982,043 A | * | 11/1934 | Brownyer | 295/11 |
| 2,033,863 A | * | 3/1936 | Piron | 295/31.1 |
| 2,222,337 A | * | 11/1940 | Gordon | 295/11 |
| 2,290,661 A | * | 7/1942 | Williams | 295/11 |
| 2,476,173 A | * | 7/1949 | Zintsmaster | 295/11 |

(Continued)

FOREIGN PATENT DOCUMENTS

DE    24 06 206 A1    8/1975

(Continued)

OTHER PUBLICATIONS

International Search Report for PCT/EP2006/063731.

*Primary Examiner*—Jason R Bellinger
(74) *Attorney, Agent, or Firm*—Proskauer Rose LLP

(57) ABSTRACT

A rubber-sprung wheel for rail vehicles includes a wheel tire which is connected to a wheel rim by a rubber insert that is formed by two flat rings that are arranged so as to be essentially vertical in relation to a wheel axle. The two flat rings are held, under considerable axial prestress, between an inner circumferential middle web of the wheel tire and two outer flanges of the wheel rim. At least one of the flanges is seated on the wheel rim with an interference fit that is designed as a conical press fit, such that a cone of the flange in a stress-free state has a lesser conicity than does a cone of the wheel rim, and in a pressed-on state rests on an entire surface against the cone of the wheel rim, at an even surface pressure across an entire width of the interference fit.

12 Claims, 8 Drawing Sheets

U.S. PATENT DOCUMENTS

| | | | | |
|---|---|---|---|---|
| 2,534,981 A | * | 12/1950 | Malmquist | 464/83 |
| 2,667,767 A | * | 2/1954 | Burrell | 464/91 |
| 2,911,252 A | * | 11/1959 | Templeton | 295/11 |
| 4,635,990 A | * | 1/1987 | Golubenko et al. | 295/11 |
| 5,183,306 A | * | 2/1993 | Emilsson | 295/11 |
| 5,582,452 A | * | 12/1996 | Murawa et al. | 295/11 |
| 7,008,182 B2 | * | 3/2006 | Kopp et al. | 415/136 |

FOREIGN PATENT DOCUMENTS

| | | |
|---|---|---|
| DE | 43 00 553 A1 | 7/1994 |
| DE | 44 30 342 A1 | 8/1995 |
| EP | 0 845 614 A2 | 6/1998 |

* cited by examiner

RAILWAY VEHICLE WHEEL WITH ELASTIC RUBBER SUSPENSION

CROSS-REFERENCE TO RELATED APPLICATIONS

This application is a National Phase Application of International Application No. PCT/EP2006/063731, filed Jun. 30, 2006, which claims the benefit of and priority to German Application No. 10 2005 030 966.6, filed Jun. 30, 2005, which is owned by the assignee of the instant application. The disclosure of each of the above applications is incorporated herein by reference in its entirety.

FIELD OF THE INVENTION

The invention relates to a rubber-sprung rail wheel in which a wheel tire is connected to a wheel rim by way of a rubber insert that is formed by two flat perforation-free rings that are arranged so as to be inclined to vertical in relation to the wheel axle, wherein the rings are exclusively held, under axial prestress, between supporting surfaces that are arranged so as to be inclined to vertical in relation to the wheel axle and that are formed by a circumferential inner middle web of the wheel tire and two outer flanges of the wheel rim, which rings, when the vehicle wheel is under radial load, are predominantly subjected to shear stress, and wherein at least one of the flanges is held directly to the wheel rim by screw bolts that are arranged outside the rings of the rubber insert.

BACKGROUND OF THE INVENTION

Such a rail wheel is known from the literature and from practical application. Rubber-sprung rail wheels have been known for considerably more than half a century and have a successful track record in practical application. In a rubber-sprung rail wheel of which hundreds of thousands have been in use, the rubber insert comprises a plurality of radially highly prestressed rubber pads that are seated in facing annular grooves of the wheel tire and of the wheel rim. When compared to such a rail vehicle wheel, the rail vehicle wheel of the type mentioned in the introduction, which rail vehicle wheel comprises the differently oriented and axially prestressed rubber insert, provides the advantage of greater axial rigidity when subjected to lateral loads such as driving along a curved section of track, and of a lower spring constant when subjected to vertical loads. However, this arrangement is associated with a disadvantage in that when subjected to vertical loads the rubber insert is essentially subjected to shear stress.

In order to be able to cope with such high shear loads, attempts have been made to use the greatest possible volume of rubber and to provide the rubber insert with very considerable axial prestress. In order to generate the very considerable axial prestress, the flanges that rim the rubber insert on the outside are braced to each other by means of screw bolts that lead through the flanges, the rubber insert and the web. While in this way even axial prestress in the rubber insert can be achieved over the diameter, this type of bracing is, however, associated with a loss of rubber volume. However, in various applications, in particular in the case of low-floor carriages, where comparatively small wheel diameters are required, it is not possible to provide a larger radial area in order to accommodate more rubber volume.

From DE 44 30 342 A1 a rubber-sprung rail wheel is known that comprises a wheel rim, a wheel tire and annular rubber inserts. They are exclusively held on both sides of the mid-plane of the wheel in annular spaces that are formed by a web that protrudes radially inwards from the wheel tire, and by flanges that correspondingly protrude radially outwards from the wheel rim, under essentially axial prestress exclusively between supporting surfaces of the web and of the flanges. While one flange is constructed in one piece with the wheel rim body, the other flange with an integrally formed annular joined-on piece of rectangular cross section is placed in a corresponding annular recess that is provided in the wheel rim body and, by means of a screw connection, is directly connected to the wheel rim body, wherein the annular joined-on piece and the annular recess form a cylindrical seat. In this arrangement the axial prestress of the rubber inserts is entirely produced by the screw connection. In order to evenly prestress the rubber inserts across their radial width, a correspondingly rigid construction of flanges and screw connections is required.

In a different type of rubber-sprung rail wheel, known from DE 24 06 206 C3, the annular rubber inserts are held under axial and radial prestress between a cylindrical and a radial supporting surface of a wheel rim ring and a radial supporting surface of a wheel disc on the one hand, and the essentially radial supporting surfaces of a middle web and the flanks of the wheel tire, which flanks are arranged immediately adjacent to said middle web and are essentially cylindrical, on the other hand. In this arrangement the radially slotted wheel rim ring with a conical seat surface rests against a corresponding conical supporting surface of the wheel disc, and is connected to it by way of screw bolts that are arranged outside the rubber insert. As a result of the inclination of the conical surfaces a self-locking seat of the wheel rim ring on the wheel disc is achieved, which wheel rim ring due to the radial slit in the diameter is radially expandable. As a result of this seat, the screw bolts are relieved by the restoring forces of the prestressed rubber insert.

SUMMARY OF THE INVENTION

The invention, in one embodiment, features a rubber-sprung rail wheel that even in the case of small wheel diameters, as used for example in low-floor carriages, provides good axial rigidity and good radial spring characteristics.

In a rubber-sprung rail vehicle wheel of the type mentioned in the introduction, the flange that is held by screw bolts is seated in an interference fit on the wheel rim, wherein the interference fit is a conical press fit in which the cone of the flange in the stress-free state has a lesser conicity than does the cone of the wheel rim, and in the pressed-on state rests with the entire surface against the cone of the wheel rim.

In the rail wheel according to the invention, by selecting the various conicities of the cones of the interference fit, a situation is achieved in which the pressed-on flange, taking into account its elastic deformation, on the one hand is securely held on the cone of the wheel rim, and on the other hand the rubber insert is optimally prestressed over its entire radial width. In this arrangement the screw bolt essentially only assumes the function of holding the flange on the seat. Said screw bolt is practically not subjected to any load as a result of the restoring force of the rubber insert. Because of the new arrangement of the flange on the wheel rim, the entire space between the web and the flanges is available for accommodating the rubber insert. When compared to the known design with the screw bolts that pass through the rubber insert, an additional rubber volume of up to 30% is gained. This has a positive effect on the ability of the rubber insert to withstand shear stress. This also makes it possible to achieve comparatively low design heights.

Accordingly, according to one embodiment of the invention, the conicities of the cones of the flange and of the wheel rim, taking into account the bending strain of the flange due to the restoring force of the prestressed rubber insert, which restoring force acts on said flange, are selected such that the axial static friction of the press fit amounts to 0.2 times to 1 times the restoring force of the prestressed rubber insert. Thus, with such dimensioning the screw bolts are practically not subjected to any force.

According to an embodiment of the invention, the rail vehicle wheel is designed optimally if the conicities of the cones of the flange and of the wheel rim, taking into account the bending strain of the flange due to the restoring force of the prestressed rubber insert, which restoring force acts on said flange, are selected such that the surface pressure of the press fit is the same across its axial width. In concrete terms this means that in the stress-free state the diameter $D_1$ of the cone of the flange, when compared to the diameter $D_2$ of the cone of the wheel rim, in each case on the inside of the wheel has a lower deviation of dimensions of $\Delta Ü_1 = 0.0005$ to $0.0035$ $D_1$, and on the outside of the wheel has a lower deviation of dimensions of $\Delta Ü_2 = 0.25$ to $0.75$ $\Delta Ü_1$ at an axial width of the interference fit of $B = 0.06$ to $0.25$ $D_1$. The angle of inclination of the conical interference fit should be $\alpha = 0.3°$ to $3.0°$.

There are various options for designing the flange. Preferably, the flange is designed as a flat ring that is supported by a ring that is screwed on with the screw bolts. However, the flange and the ring can also be designed as one part.

Provided the two rings of the rubber insert are arranged so as to be exactly perpendicular in relation to the wheel axle, when subjected to radial wheel loads they are exclusively subjected to shear stress. However, it is advantageous if they face each other at a slight incline, such that in the case of a radial axle load the rubber rings are not only subjected to shear stress but also to pressure. Their angle of inclination in relation to the wheel axle can be up to 75°. In this arrangement the angles of inclination of the two rings can differ.

In practical application rubber inserts have been proven reliable that have a shore hardness of 60 to 85 and that in the installed state are compressed by 5% to 17% of their thickness. Preferably, the rubber inserts comprise molded-on rings on their outsides.

If the rail vehicle wheels are braked and/or used as drive wheels, they are not only subjected to loads in axial and radial directions but also in circumferential direction. This load must then also be handled by the rubber insert. In order to prevent the rubber insert from becoming displaced in relation to the web and the flanges, the wheel tire can comprise projections on the outsides of the two rings of the rubber insert as an antirotational device relative to the wheel rim, which projections engage, with positive fit, recesses in the adjacent sides of the flanges and of the web.

In order to, on the one hand, provide sufficient clearance to the web and to the rubber insert during spring deflection, and in order to, on the other hand, prevent stress concentration at the points of transition between the wheel rim and the flanges, on its outer periphery in the region of the rubber insert the wheel rim can comprise a flat circumferential spring deflection bed for the web of the wheel tire and the rubber insert, wherein the radius of curvature of the rim areas of said spring deflection bed becomes increasingly smaller towards the outside.

BRIEF DESCRIPTION OF THE DRAWINGS

Below, the invention is explained in more detail with reference to a drawing that shows several exemplary embodiments. The following are shown.

DESCRIPTION OF THE INVENTION

Figure 1:
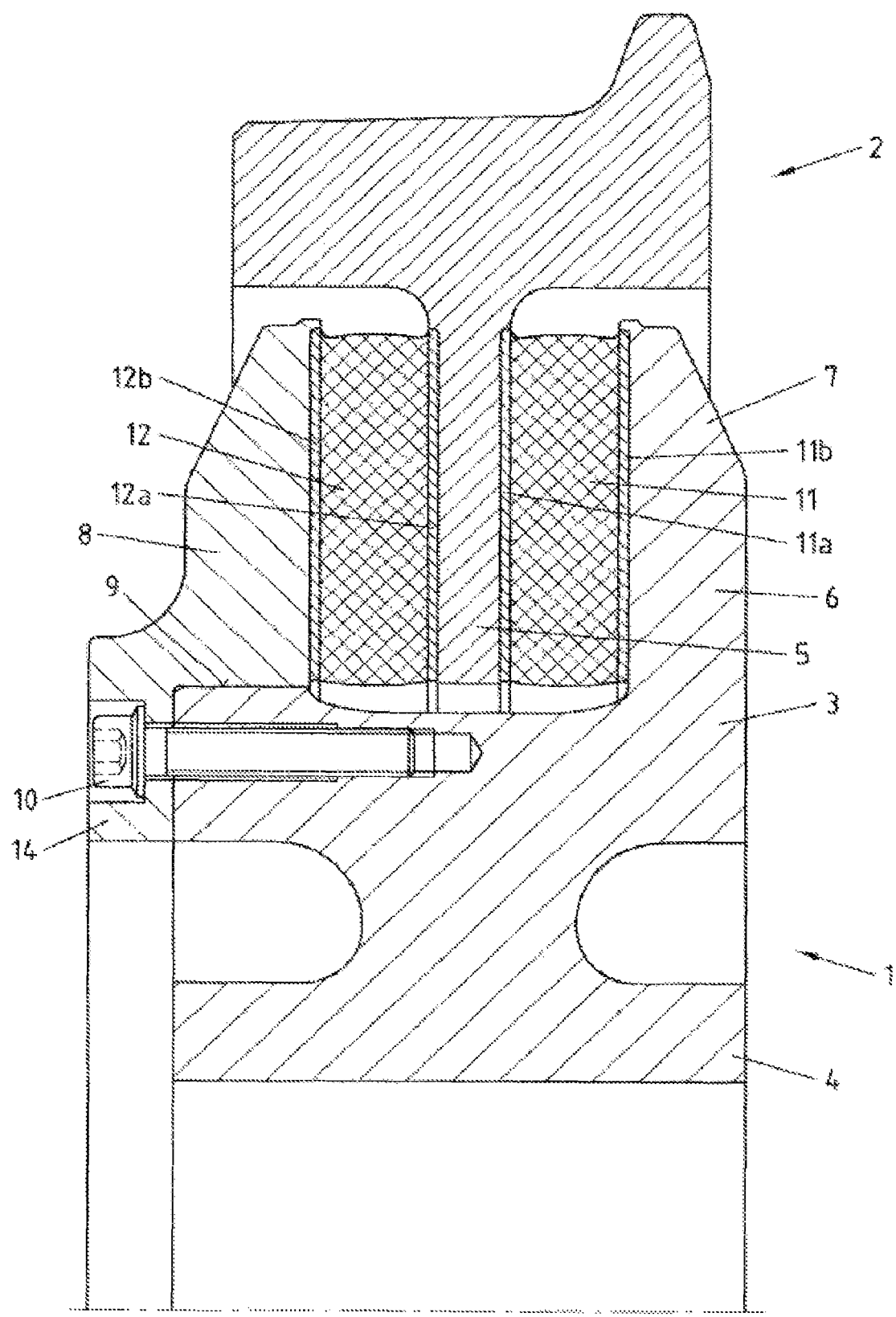
FIG. 1 a radial half section of a rail wheel for low-floor vehicles, comprising conventional wheel sets.

The rail vehicle wheel shown in FIG. 1 is designed for low-floor vehicles. It comprises a disc wheel body 1 and a wheel tire 2. The disc wheel body 1 comprises a wheel rim 3 and a wheel hub 4. The wheel tire 2 comprises a circumferential inside middle web 5. The wheel rim 3 comprises two flanges 7, 8, of which one flange 7 is connected in one piece to the wheel rim 3, while the other flange 8, by means of an interference fit 9, is seated on the wheel rim 3 and is additionally held by screw bolts. The wheel tire 2 is connected to the wheel rim 3 by way of a rubber insert that comprises two flat rings 11, 12, on the outsides of which flat rings 11, 12, rings 11a, 11b, 12a, 12b are molded on. The rings 11, 12 that form the rubber insert have a shore hardness of 60 to 85 and are loaded with very considerable axial prestress. Their thickness is compressed by 5 to 17%. Due to this very considerable axial prestress that is to be produced by the flange 8 the interference fit 9 is designed in a particular manner.

Figure 7:
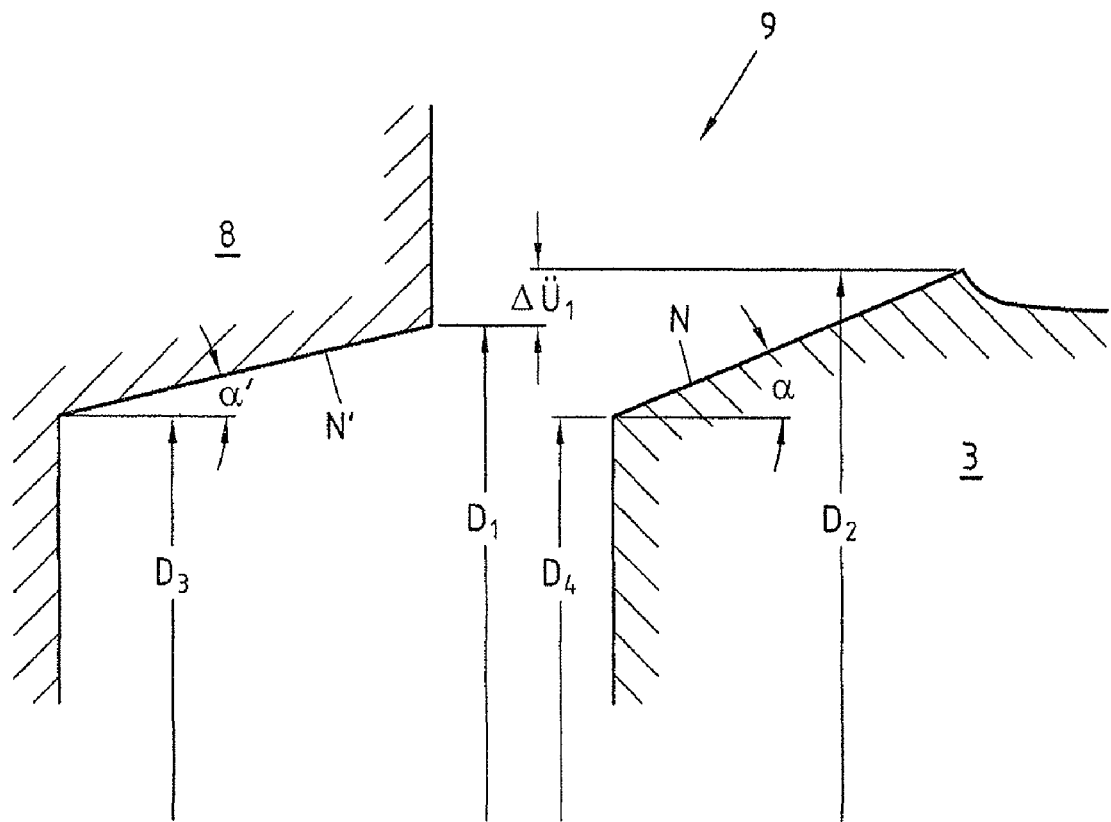
FIG. 7 a diagrammatic section view of a conical press fit of the rail vehicle wheels shown in FIGS. 1 to 6.

The interference fit 9 is a conical press fit. As shown in FIG. 7 in an exaggerated manner for the sake of clarity, the angle of inclination $\alpha$ of the cone N of the wheel rim 3 is larger than the angle of inclination $\alpha'$ of the cone N' of the flange 8. The angles of inclination $\alpha$, $\alpha'$ are between 0.3° and 3°. In the stress-free state the diameter $D_1$ of the cone N' of the flange 8, when compared to the diameter $D_2$ of the cone N of the wheel rim 3, in each case on the inside of the wheel has an upper deviation of dimensions of $\Delta Ü_1 = 0.0005$ to $0.0035$ $D_1$, and on the outside of the wheel the corresponding diameters $D_3$, $D_4$ have an upper deviation of dimensions of $\Delta Ü_2 = 0.25$ to $0.75$ $\Delta Ü_1$. With these dimensions of the involved components in the initial state, i.e. prior to installation, in the installed state a firm seat of the press fit results with the desired very considerable axial prestress of the rings 11, 12 of the rubber insert. In this arrangement the expansion effect of the flange 8 is taken into account, which expansion effect occurs due to the restoring force of the rings 11, 12 of the prestressed rubber insert, which restoring force acts on said flange 8. Consequently, this expansion effect, in conjunction with the special conical design of the interference fit 9, ensures that the surface pressure is even across the entire width of the interference fit 9. Because the flange 8 is held by said interference fit 9, the screw bolts 10 are relieved. In an ideal case said screw bolts 10 only assume securing functions.

Figure 8:
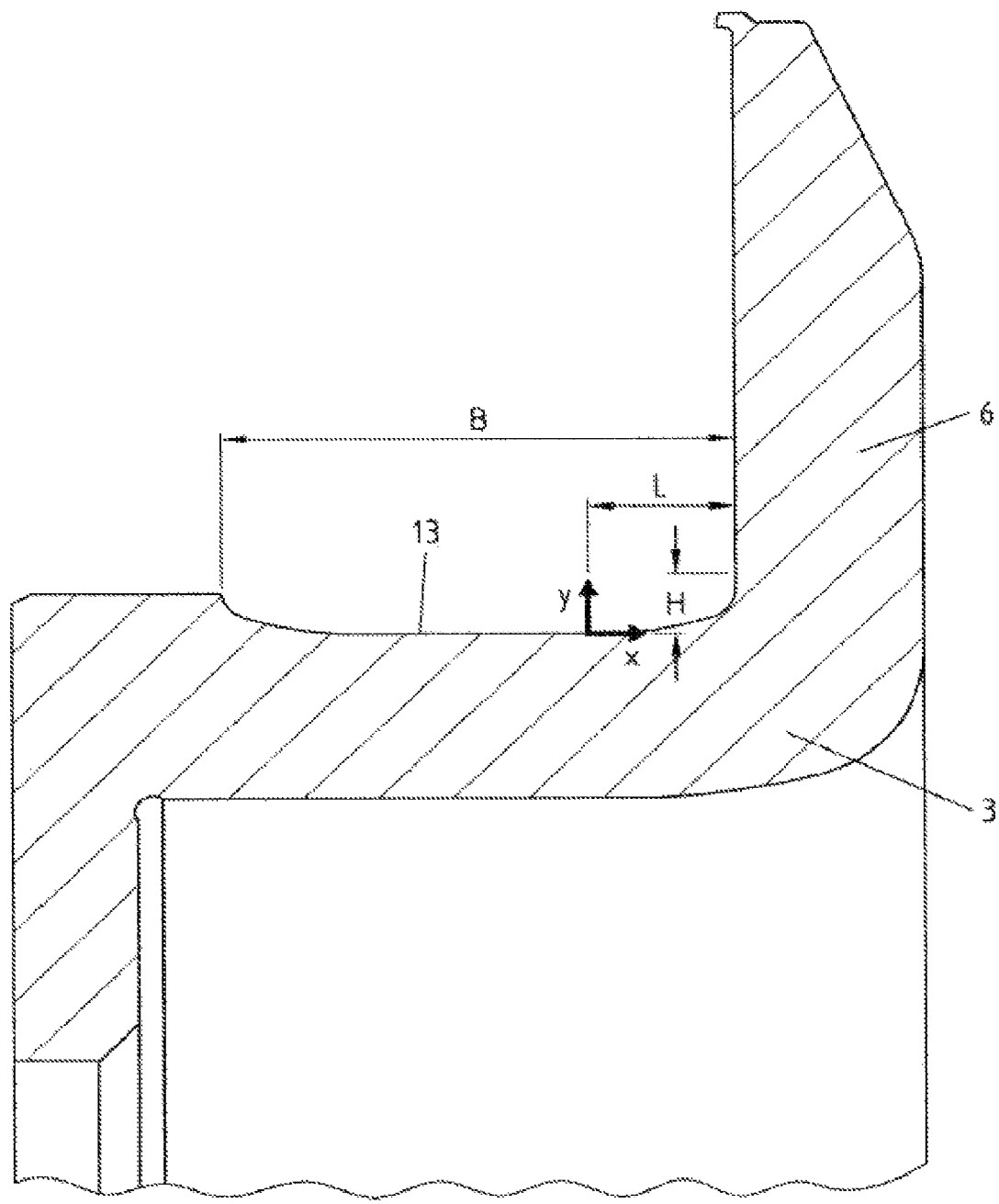
FIG. 8 a radial half section of a wheel rim of the rail vehicle wheel shown in FIG. 3.

In order to, on the one hand, provide sufficient clearance for radial spring deflection to the wheel tire 2 with the rings 11, 12 of the rubber insert, and in order to, on the other hand, prevent stress concentration in the transition region from the wheel rim 3 to the integrally formed flange 6, the wheel rim 3, on its outer periphery in the region of the rings 11, 12, comprises a spring deflection bed 13 for the web 5 of the wheel tire 2 and of the rings 11, 12, wherein the radius of curvature of rim areas of said spring deflection bed 13 becomes increasingly smaller towards the outside. With the use of the designations shown in FIG. 8 the curve of the spring deflection bed 13 meets the following function: $y=f(x)=0.07045-0.30105x+0.18546x^2-0.03849x^3+0.003756x^4-0.000169x^5+2.854 \cdot 10^{-6} x^6$, wherein the starting point at L=0.3 is up to 0.5 B of the width of the spring deflection bed. The radius of curvature ends at H=0.1 to 0.3 L.

Figure 2:
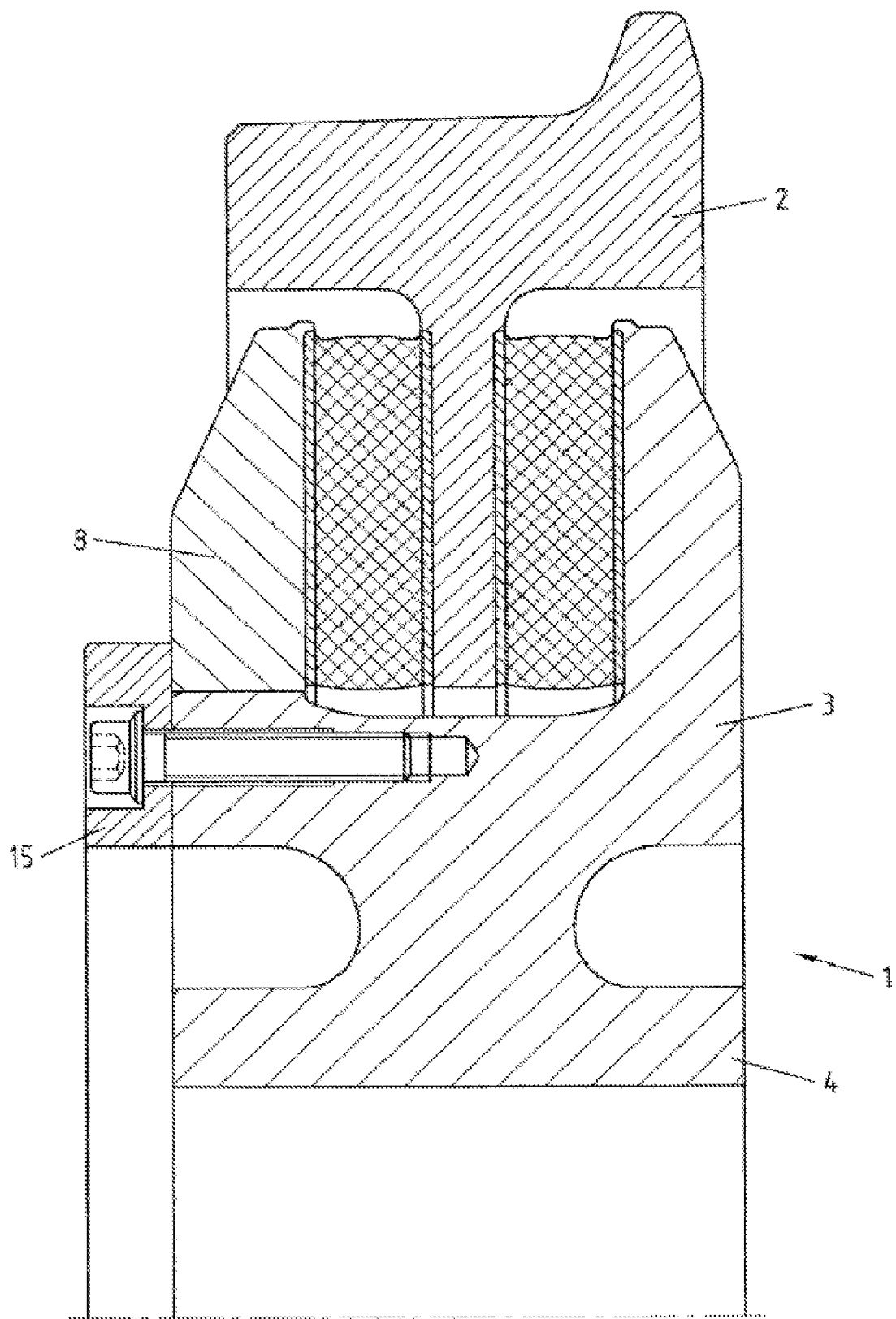
FIG. 2 a half section of a rail wheel for low-floor vehicles, with the design differing from that shown in FIG. 1.

While in the exemplary embodiment shown in FIG. 1 the flange 8 is held by the screw bolts 10 by way of an integrally formed retaining ring 14, in the exemplary embodiment shown in FIG. 2 it is held by an independent retaining ring 15, which reaches slightly over the flange 8 only at the inner rim.

Figure 3:
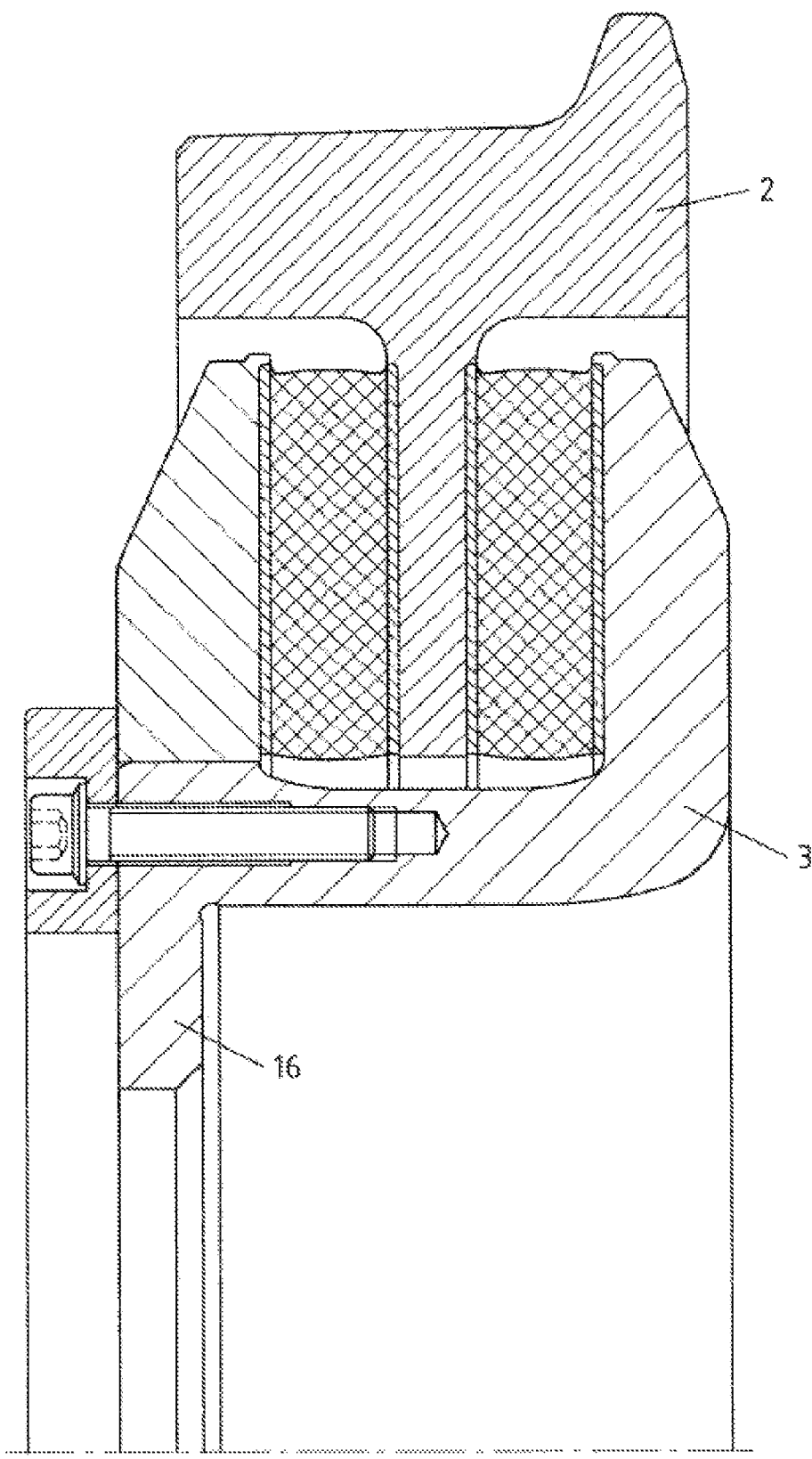
FIG. 3 a radial half section of a rail wheel for low-floor vehicles with loose wheels.
Figure 4:
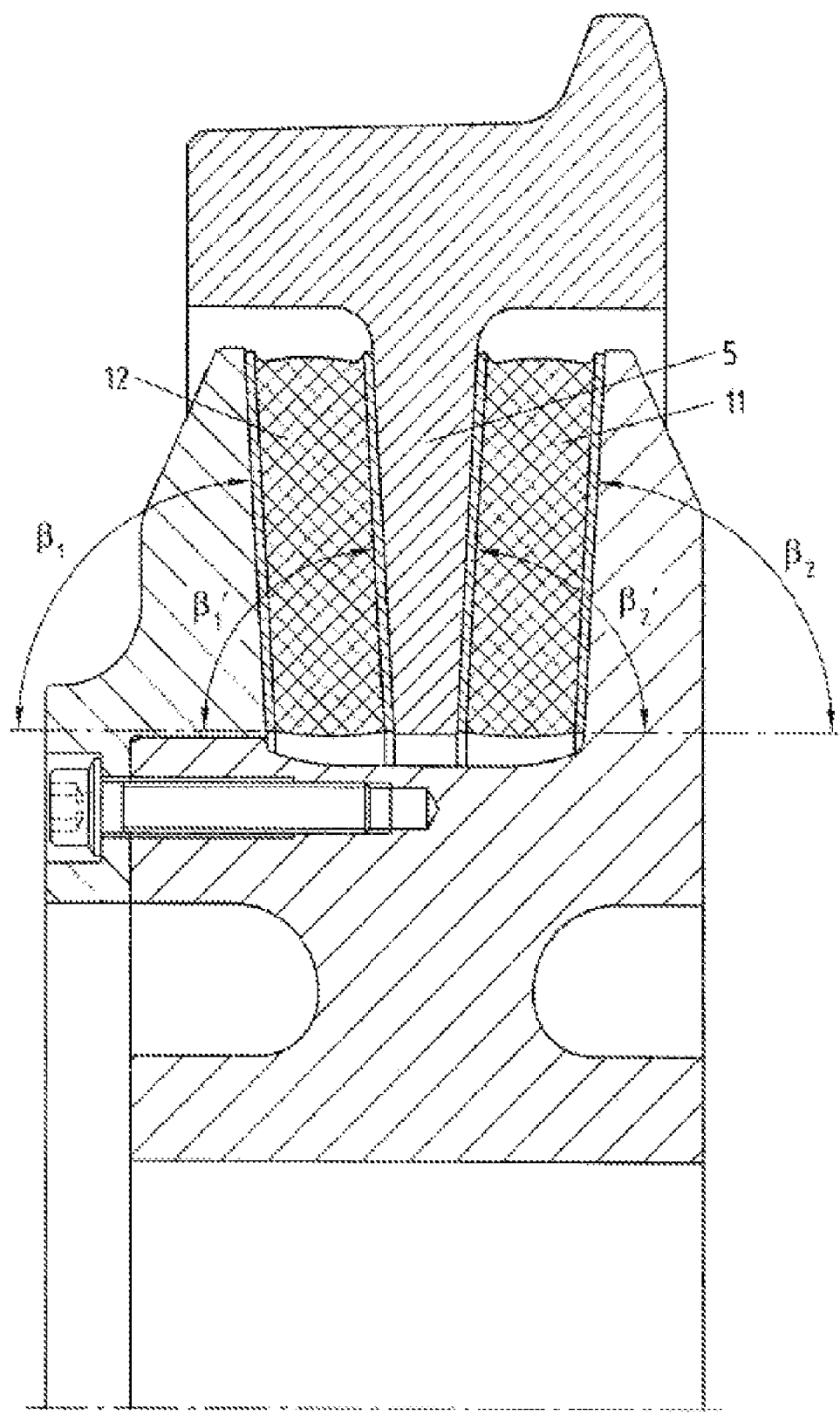
FIG. 4 a radial half section of a rail wheel for low-floor vehicles, with the design differing from that shown in FIG. 1.

While in the exemplary embodiment shown in FIG. 2 the wheel rim 3 forms part of a wheel body 1, in the exemplary embodiment shown in FIG. 3 a mounting flange 16 is integrally formed on the wheel rim 3, which mounting flange 16 can be affixed to a corresponding counter flange of a drive or the like.

In the vehicle wheel according to the exemplary embodiment 4, in a manner that is different to the exemplary embodiments described so far, the rings 11, 12 of the rubber insert are placed at a slight inclination against the wheel axle, namely such that in the case of a radial wheel load the rubber inserts 11, 12 are not only subjected to shear stress but also to pressure. The inclined position of the rings 11, 12 of the rubber insert results in a conical shape of the web 5. The angles of inclination $\beta_1$, $\beta_2$ of the rubber inserts are between 75° and 90°. It can vary. Moreover, the inclination of the respective outsides of a ring 11, 12 can be different. For example, the difference of the angles $\beta_1$, $\beta_1'$, or $\beta_2$, $\beta_2'$ can be in the region of 15°. Preferably, the angles $\beta_1$, $\beta_1'$, $\beta_2$, $\beta_2'$ of the outsides of a ring 11, 12 are selected such that the rings 11, 12 are somewhat thicker in the radially outer region than in the radially inner region.

Figure 5:
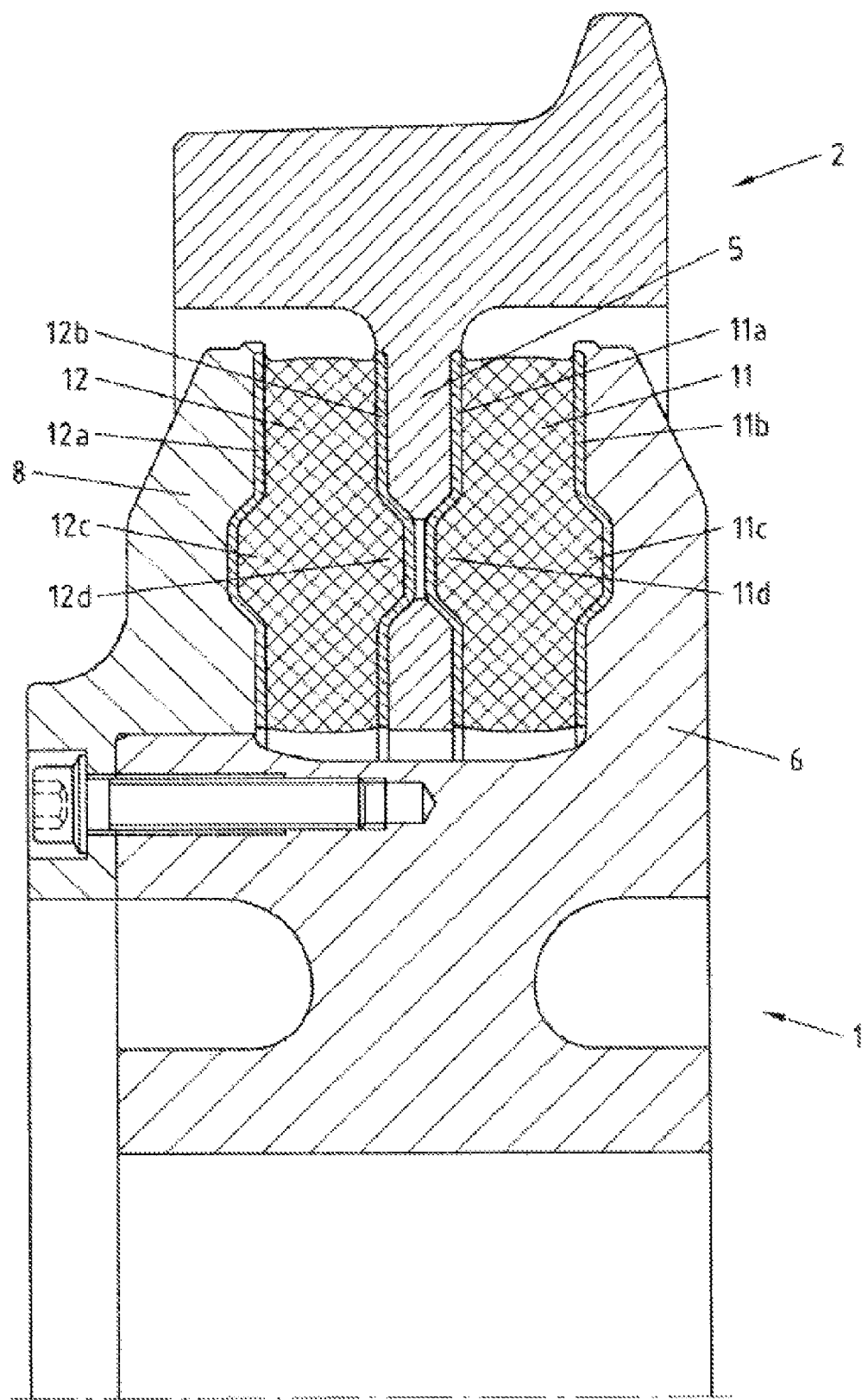
FIG. 5 a radial half section of a rail vehicle wheel, with the design differing from that shown in FIG. 1.
Figure 6:
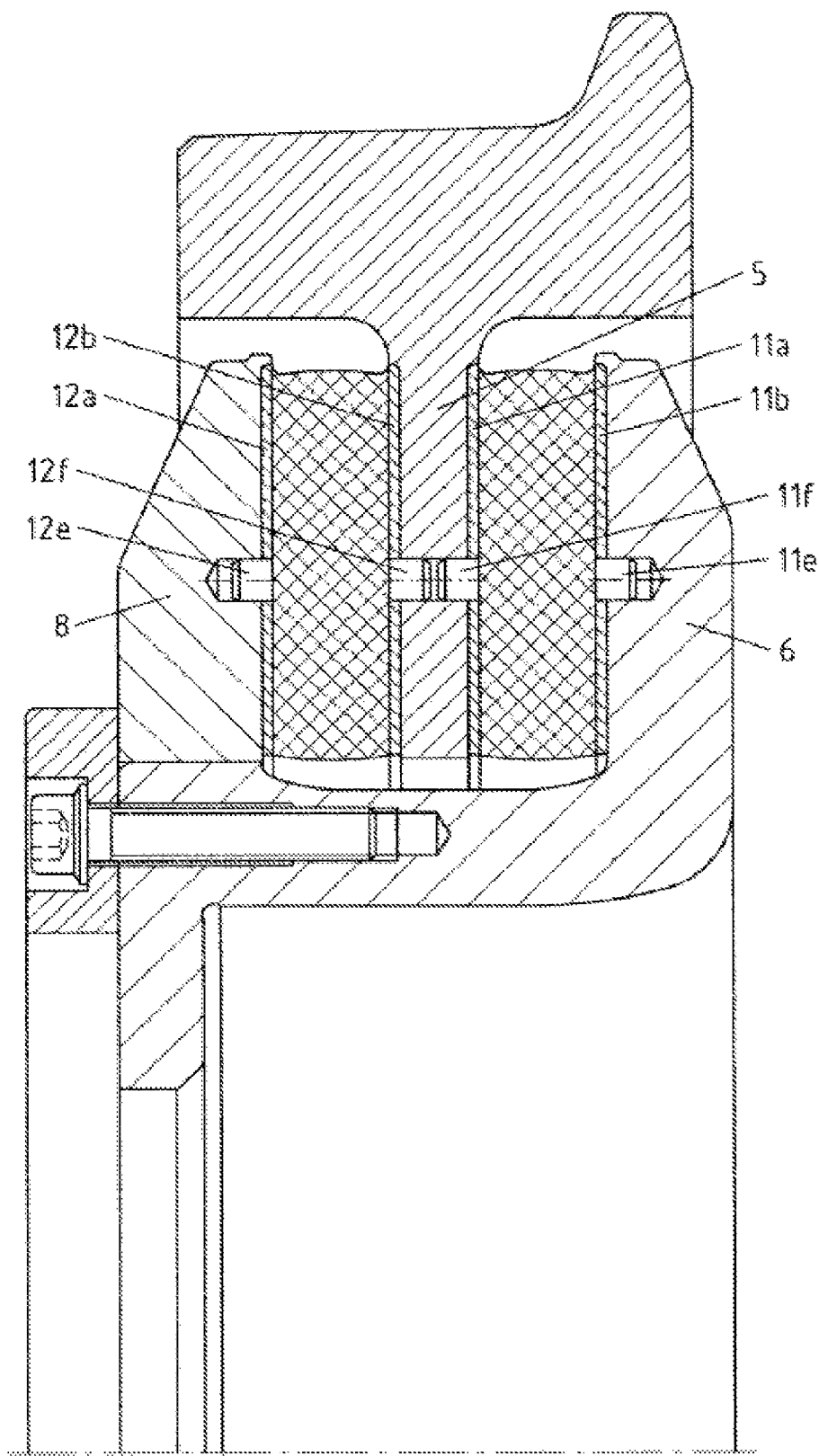
FIG. 6 a radial half section of a rail vehicle wheel, with the design differing from that shown in FIG. 1.

While in the exemplary embodiment of FIG. 1 the outsides of the rings 11, 12, which comprise the molded-on rings 11a, 11b, 12a, 12b, of the rubber insert are smooth, in the exemplary embodiment shown in FIG. 5 they comprise humps. Instead, with projections 11c, 11d, 12c, 12d they engage, having positive fit, corresponding recesses in the flanges 6, 8 and in the web 5. In this way an antirotational device between the wheel tire 2 and the wheel body 1 is achieved. In the exemplary embodiment of FIG. 6 such an antirotational device is achieved in a somewhat different way. In this exemplary embodiment the annular metal sheets comprise pin-shaped projections 11e, 11f, 12e, 12f, by means of which they engage corresponding recesses in the flanges 6, 8 and in the web 4.

The invention claimed is:

1. A rail vehicle wheel in which a wheel tire is connected to a wheel rim by way of a rubber insert that is formed by two coplanar perforation-free rings arranged to be inclined or vertical in relation to a wheel axle, wherein the two coplanar perforation-free rings are exclusively held, under axial prestress, between supporting surfaces arranged to be inclined or vertical in relation to the wheel axle and that are formed by a circumferential inner middle web of the wheel tire and two outer flanges of the wheel rim, wherein the two coplanar perforation-free rings, when the rail wheel is under a radial load, are predominantly subjected to shear stress, and wherein at least one of the two outer flanges is held directly to the wheel rim by screw bolts arranged radially outside the two flat perforation-free rings of the rubber insert, wherein the at least one flange held by the screw bolts is seated in an interference fit on the wheel rim, wherein the interference fit is a conical press fit in which a first cone of the at least one flange in a stress-free state has a lesser angle of inclination than does a second cone of the wheel rim, and in a pressed-on state rests with the entire surface of the first cone against the second cone of the wheel rim.

2. The rail vehicle wheel of claim 1 wherein respective angles of inclination of the first cone of the at least one flange and the second cone of the wheel rim, taking into account a bending strain of the flange due to a restoring force of the two coplanar perforation-free rings of the rubber insert that is prestressed, which restoring force acts on the at least one flange, are selected such that an axial static friction of a press fit when in the pressed-on state amounts to 0.2 times to 1 times the restoring force of the rubber insert that is prestressed.

3. The rail vehicle wheel of claim 1 wherein respective angles of inclination of the first cone of the at least one flange and the second cone of the wheel rim, taking into account a bending strain of the flange due to a restoring force of the two flat perforation-free rings of the rubber insert that is prestressed, which restoring force acts on the at least one flange, are selected such that a surface pressure of a press fit when in the pressed-on state is the same across the axial width of the press fit.

4. The rail vehicle wheel of claim 1 wherein in the stress-free state a first diameter of the first cone of the at least one flange, when compared to a second diameter of the second cone of the wheel rim, in each case on an inside of the wheel has a first upper deviation of dimensions of 0.0005 to 0.0035 times the first diameter, and on an outside of the wheel has a second upper deviation of dimensions of 0.25 to 0.75 times the first upper deviation at an axial width of the interference fit of 0.006 to 0.25 times the first diameter.

5. The rail vehicle wheel of claim 1 wherein an angle of inclination of the conical press fit is 0.3° to 3.0°.

6. The rail vehicle wheel of claim 1 wherein the at least one flange of the interference fit is designed as a flat ring that is supported by a second ring that is screwed on with the screw bolts.

7. The rail vehicle wheel of claim 1 wherein the two coplanar perforation-free rings of the rubber insert are oppositely inclined.

8. The rail vehicle wheel of claim 1 wherein angles of inclination of the two coplanar perforation-free rings in relation to the wheel axle are between 75° and 90°.

9. The rail vehicle wheel of claim 1 wherein angles of inclination of the two coplanar perforation-free rings differ.

10. The rail vehicle wheel of claim 1 wherein the two coplanar perforation-free rings of the rubber insert have a shore hardness of 60 to 85 and in an installed state are compressed by 5% to 17% of the thickness of the two coplanar perforation-free rings.

11. The rail vehicle wheel of claim 1 wherein the wheel tire comprises projections on outsides of the two coplanar perforation-free rings of the rubber insert as an antirotational device relative to the wheel rim, the projections engaging, with positive fit, recesses in adjacent sides of the two outer flanges and of the circumferential inner middle web.

12. The rail vehicle wheel of claim 1 wherein the wheel rim comprises a flat circumferential spring deflection bed for the circumferential inner middle web of the wheel tire and the two coplanar perforation-free rings of the rubber insert on the outer periphery of the wheel rim in a region of the rubber insert, wherein a radius of curvature of rim areas of the flat circumferential spring deflection bed becomes increasingly smaller towards an axial outside of the spring deflection bed.

* * * * *